(12) United States Patent
Loce et al.

(10) Patent No.: US 6,243,499 B1
(45) Date of Patent: Jun. 5, 2001

(54) TAGGING OF ANTIALIASED IMAGES

(75) Inventors: Robert P. Loce; Yeqing Zhang, both of Webster; Michael Branciforte, Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/046,424

(22) Filed: Mar. 23, 1998

(51) Int. Cl.⁷ .................................................. G06K 9/40
(52) U.S. Cl. ............................................. 382/269; 382/266
(58) Field of Search ................................. 382/266–269, 382/242; 358/1.9

(56) References Cited

U.S. PATENT DOCUMENTS

| | | | |
|---|---|---|---|
| 5,138,339 | 8/1992 | Curry et al. | 346/108 |
| 5,386,509 | 1/1995 | Suzuki et al. | 395/162 |
| 5,432,898 | 7/1995 | Curb et al. | 395/143 |
| 5,438,656 | 8/1995 | Valdes et al. | 395/143 |
| 5,485,289 | 1/1996 | Curry | 358/448 |
| 5,596,684 | 1/1997 | Ogletree et al. | 395/109 |
| 5,646,751 | 7/1997 | Motamed et al. | 358/518 |
| 5,673,376 | 9/1997 | Ray et al. | 395/127 |
| 5,838,334 | * 11/1998 | Dye | 345/503 |
| 6,137,918 | * 11/2000 | Harrington et al. | 382/239 |
| 6,144,461 | * 11/2000 | Crean et al. | 358/1.9 |
| 6,167,166 | * 12/2000 | Loce et al. | 382/266 |

OTHER PUBLICATIONS

"A Comparison of Antialiasing Techniques," IEE CG&A, vol. 1, No. 1, Jan. 1981, pp. 40–48, F. Crow.

* cited by examiner

Primary Examiner—Thomas D. Lee
Assistant Examiner—Stephen Brinich
(74) Attorney, Agent, or Firm—Duane C. Basch

(57) ABSTRACT

The present invention is a method and apparatus for the identification and tagging of antialiased pixels within regions of an image. The techniques described improve the recognition of fine gray features and enable the detection of both black and white features on high and low contrast backgrounds. The system relies on the establishment of the sense (positive/negative) of an image by first using a histogramming operation. Once the sense is determined, a plurality of logical channels are used to select a threshold, binarize a region of the image, generate a vector representative of the region, and to process the vector to identify whether an antialiased pixel is present therein. Subsequently, the output of the channels is logically combined to produce an antialias tag.

17 Claims, 6 Drawing Sheets

| $X_1$ | $X_2$ | $X_3$ | $X_4$ | $X_5$ |
|---|---|---|---|---|
| $X_6$ | $X_7$ | $X_8$ | $X_9$ | $X_{10}$ |
| $X_{11}$ | $X_{12}$ | $X_{13}$ | $X_{14}$ | $X_{15}$ |
| $X_{16}$ | $X_{17}$ | $X_{18}$ | $X_{19}$ | $X_{20}$ |
| $X_{21}$ | $X_{22}$ | $X_{23}$ | $X_{24}$ | $X_{25}$ |

*FIG. 5*

| ENTRY # | 8-BIT INPUT VECTOR | OUTPUT (SPLIT/STATE) |
|---|---|---|
| 0 | 0000 0000 | -/00 |
| 1 | 0000 0001 | -/01 |
| 2 | 0000 0010 | -/11 |
| 3 | 0000 0011 | -/11 |
| • | • | • |
| • | • | • |
| • | • | • |
| 56 | 0011 1000 | s/11 |
| 57 | 0011 1001 | s/11 |
| 58 | 0011 1010 | s/11 |
| • | • | • |
| • | • | • |
| • | • | • |
| 118 | 0111 0110 | -/10 |
| 119 | 0011 0111 | -/10 |
| 120 | 0111 1000 | s/11 |
| • | • | • |
| • | • | • |
| • | • | • |
| 255 | 1111 1111 | s/11 |

*FIG. 6*

TAGGING OF ANTIALIASED IMAGES

This invention relates generally to a method and apparatus to enable the printing of antialiased images and other image structures with gray borders, and more particularly to an edge-identification method, which can be implemented in logic, for generating antialiased rendering tags and rendering signals within an architecture designed for the printing antialiased text or line regions.

CROSS REFERENCE

The following related applications are hereby incorporated by reference for their teachings:

"METHOD FOR GENERATING RENDERING TAGS TO FACILITATE THE PRINTING OF ANTI-ALIASED IMAGES," P. Crean et al., Application Ser. No. 09/046,232, filed concurrently herewith, now U.S. Pat. No. 6,144,461;

"A METHOD OF ENCODING HIGH RESOLUTION EDGE POSITION INFORMATION IN CONTINUOUS TONE IMAGE INFORMATION," N. Zeck et al., Application Ser. No. 09/046,231, filed concurrently herewith, now U.S. Pat. No. 6,020,979;

"TEXT QUALITY ENHANCEMENT VIA RESOLUTION ENHANCEMENT TECHNIQUE BASED ON SEPARATING JAGGEDNESS DETECTION AND FILTERING," R. Eschbach, Application Ser. No. 08/937,406, filed Sep. 25, 1997, now U.S. Pat. No. 5,956,470;

"METHOD TO ENABLE THE RECOGNITION AND RENDERING OF ANTIALIASED IMAGES," R. Loce et al., Application Ser. No. 09/046,414, filed concurrently herewith, now U.S. Pat. No. 6,167,166; and "MEMORY-EFFICIENT TAGGING OF ANTIALIASED IMAGES," S. Harrington et al., Application Ser. No. 09/046,426 filed concurrently herewith, now U.S. Pat. No. 6,137,918.

BACKGROUND AND SUMMARY OF THE INVENTION

Antialiasing in the context of digitizing line art and certain graphical image structures is best known as a method of using intermediate levels of intensity to achieve subpixel position of edges for several reasons including reduction or elimination of jaggies on the edges of lines and polygons, including text. As used herein the term antialiased is intended to refer to those segments or regions of an image that are effected by an antialiasing operation applied to the image (e.g. an image processing operation or a physical process resulting in gray pixels along the edges of line art or text). Jaggies are, primarily visible at the edges of sloped lines approaching horizontal or vertical. The term antialiasing suggests an analog term aliasing; normally representing the presence of low frequencies resulting from sampling high frequency signals at too low a sampling rate.

Consider a near-vertical (or near-horizontal) line segment. To be perfectly reproduced in a printed media, the phase, which represents the location of the edge, must continuously vary along the length of a segment. Due to the inherent sampling of a bi-level display or printed output, the phase exhibits jump discontinuities. Thus, this form of aliasing artifact, leads to an induced jagged appearance where the structures are referred to as jaggies. Within a sampled image any graphical object is eventually approximated as a polygon or collection of polygons. These polygons have straight edges some of which will exhibit aliasing (jaggies and other placement defects). FIG. 1 for example shows aliasing in two dimensions. When the triangle on the top of FIG. 1 is rasterized, the edges are aliased as reproduced in the triangle shown at the bottom of FIG. 1. In particular, the position along the bottom edge should move up slightly from column to column as one looks from left to right in the image at the bottom of FIG. 1. However, the position is quantized, as illustrated, producing the jagged appearance along the bottom of the triangle. Visibility of the anti-aliased image artifacts is increased by the regular nature of the jaggies, again a result of sampling.

Consider the following systems and their capability, or incapability, to utilize antialiased pixels. Xerox's Docucolor 40, for example, employs a high frequency analog line screen to render antialiased pixels, but that is not an option for some products or marked segments. When conventional screens (e.g., approximately equal to 130–150 CPI dots) are employed in a rendering module, antialiased pixels are halftoned and printed, resulting in objectionable halftone dots positioned along character edges. Hyperacuity printing techniques, for example those described by Curry, et al. (U.S. Pat. No. 5,138,339 and U.S. Pat. No. 5,485,289) can provide rendering for antialiased pixels that is compatible with simultaneously printing dot screen halftones in enhanced line art. However, these techniques require the use of tags to identify the antialiased pixels as antialiased line art. In the preferred embodiments described with respect to the present invention the rendering architecture distinguishes text/line art from contone images to appropriately treat both image types. As will be described herein an algorithm or method may be employed in a rendering module or in other components of the rendering device to convert gray antialiased pixels to a form suitable for xerographic printing.

Antialiased images can be generated by capturing the image at a resolution greater than the final or desired output resolution, then reducing the resolution of the image by sub-sampling using an averaging process. A major benefit of antialiased images is that high contrast, saturated objects are surrounded with pixels possessing intermediate values that visually suggest the true, higher resolution position of object edges.

For example, in binary printing systems, such as many xerographic or ink jet systems that use a halftoning process to simulate continuous tone images, these antialiased edge pixels should be rendered with a very high frequency cell, ideally one having the resolution of the final output image. If the standard system halftone dot were to be used, the antialiased edges would be serrated or jagged at the standard halftone frequency. This rendering would reduce or even negate any value obtained through antialiasing. The use of a very high frequency screen over the entire antialiased image renders the antialiased pixel properly, but tends to sharpen the tonal curve and provoke print quality defects in the overall image.

Antialiasing produces image structures with gray borders or boundaries. Gray borders can also be present in an image due to the nature of a particular image structure. For instance, a gray character on a white background and a white character on a gray background also possess gray borders. As is the case for antialiased edge pixels, it is generally desirable to render the borders for gray objects with a high frequency screen, while is may be desired to render the interior of the gray stroke with a lower frequency screen chosen for attributes other than edge rendition. Through an optimized use of thresholds, these border pixels can be tagged, and subsequently optimally rendered, in a similar manner to border pixels that are gray due to antialiasing. This form of selective rendering will produce a high frequency edge outline at the gray-to-white border (note the border can be also be between two gray levels given the use for adaptive thresholds). Throughout the present discussion both types of border pixels (from gray objects and from antialiased objects) will sometimes be referred to simply as antialiased pixels.

Hence, the present invention is directed to a method for detecting antialiased image regions and creating rendering tags within an architecture designed for the rendering of antialiased text or line regions, thereby enabling the antialiased pixels to be rendered in a manner distinguishable from that applied to continuous tone portions of an image.

Heretofore, a number of patents and publications have disclosed information relevant to antialiasing, the relevant portions of which may be briefly summarized as follows:

U.S. Pat. No. 5,646,751 to Motamed et al., issued Jul. 8, 1997, teaches a method for improving the speed of a color conversion operation using pixel tagging.

In "A Comparison of Antialiasing Techniques," IEEE CG&A, Vol. 1, No. 1, January 1981, pp. 40–48, F. Crow teaches that prefiltering is a computationally effective technique for antialiasing.

U.S. Pat. No. 5,432,898 to Curb et al, issued Jul. 11, 1995, provides a system and method for anti-aliasing of lines within a data processing system having graphics capability, which requires a minimum amount of hardware to implement and does not degrade the performance or speed of the system.

U.S. Pat. No. 5,438,656 to Valdes, et al., issued Aug. 1, 1995, describes a method of synthesizing multi-level raster shapes directly from ideal shapes.

In accordance with the present invention, there is provided an edge-detecting method for detecting antialiased pixels within continuous tone image data representing an image, wherein a logic-based implementation of the edge-detecting method includes the steps of: determining a threshold for a region of the image; in a first channel, setting a threshold to be used to binarize the region of the image, the threshold being determined as a function of a first image criterion, thresholding at least a region of the continuous tone image to create a binarized image region, extracting, from the binarized image region, a vector comprised of a predefined set of pixels within the binarized image region, applying the vector to a first channel logic operation to determine if a predefined pattern is present, and if so, indicating the presence of the pattern as a first channel output;

in a second channel, setting a second threshold to be used to binarize the region of the image, the second threshold being determined from a second image criterion, thresholding the region of the continuous tone image to create a second binarized image region, extracting, from the second binarized image region, a vector comprised of a predefined set of pixels within the second binarized image region, applying the vector to a second channel logic operation to determine if a second predefined pattern is present, and if so, indicating the presence of the second pattern as a second channel output; and logically combining the outputs of at least the first channel and the second channel to produce a tag indicative of the presence or absence of a gray border pixel within the region of the image.

In accordance with another aspect of the present invention, there is provided an apparatus for detecting antialiased pixels within continuous tone image data representing an image, including: means for histogramming the continuous tone image data to determine a threshold for a region of the image; a first channel, having a thresholder to binarize the region of the image using a threshold determined as a function of a first image criterion, and create a binarized image region, vector memory for storing a vector comprised of a predefined set of pixels within the binarized image region, the vector being extracted from the binarized image region, a look-up table for receiving the vector from said vector memory, applying the vector to a first channel logic operation to determine if a predefined pattern is present, and if so, indicating the presence of the pattern in an output of the look-up table; a second channel, having a thresholder to binarize a region of the image using a threshold determined as a function of a second image criterion, and create a second binarized image region, second vector memory for storing a second vector comprised of a predefined set of pixels within the second binarized image region, the second vector being extracted from the second binarized image region, a second look-up table for receiving the vector from said second vector memory, applying the vector to a second channel logic operation to determine if a predefined pattern is present, and if so, indicating the presence of the pattern in an output of the second look-up table; a tag map for logically combining the channel outputs to produce a tag indicative of the presence or absence of an antialiased pixel within the region of the image.

In accordance with yet another aspect of the present invention, there is provided a method for identifying thin, gray lines containing antialiased pixels within continuous tone image data representing an image, including the steps of: identifying a subset of image pixels within a window centered about a target pixel; histogramming the pixels within the subset; determining the sense of the target pixel; as a function of the sense of the neighboring window context of the target pixel; determining whether the current pixel is an antialiased pixel; and generating an output tag indicative of the antialiased nature of the target pixel.

In accordance with the present invention, there is provided a method for detecting antialiased pixels within continuous tone image data representing an image, including the steps of: determining a threshold for a region of the image; in a first channel, setting a threshold to be used to binarize the region of the image, the threshold being determined as a function of a first image criterion, such as an image background level, thresholding at least a region of the continuous tone image to create a binarized image region, extracting, from the binarized image region, a vector comprised of a predefined set of pixels within the binarized image region, applying the vector to a first channel logic operation to determine if a predefined pattern is present, and if so, indicating the presence of the pattern as a first channel output;

in a second channel, setting a second threshold to be used to binarize the region of the image, the second threshold being determined as a function of a second image criterion, such as an image foreground level, thresholding the region of the continuous tone image to create a second binarized image region, extracting, from the second binarized image region, a vector comprised of a predefined set of pixels within the second binarized image region, applying the vector to a second channel logic operation to determine if a second predefined pattern is present, and if so, indicating the presence of the second pattern as a second channel output; and logically combining the outputs of at least the first channel and the second channel to produce a tag indicative of the presence or absence of an antialiased pixel within the region of the image.

One aspect of the invention deals with a basic problem in the rendering of antialiased images, particularly text and line art regions—identifying the antialiased regions when present on a non-white (e.g., printed) background and an appropriate technique for rendering the antialiased regions. This aspect is further based on the discovery of improved techniques that are able to detect antialiased fine gray features and the presence of antialiased regions on gray or black backgrounds. The technique is preferably employed in a rendering architecture that distinguishes between image types (e.g., binary text or lines and continuous tone), determines whether a given pixel has been antialiased, tags the pixel, and directs the rendering operation accordingly.

Another aspect of the present invention preferably employs histogramming techniques to determine foreground levels and background levels for the identification of gray objects within the image field, which also may be gray. Once the levels are established, thresholds can be used to distinguish foreground objects from background levels and pattern matching can be employed to identify the presence of particular border patterns. The border pixels are tagged in a similar manner to pixels that are gray due to antialiasing.

BRIEF DESCRIPTION OF THE DRAWINGS

FIG. 5 is an exemplary illustration of a window used to identify a subset of image pixels;

FIG. 6 is an illustrative example of a look-up table as used in the present invention to map binary vectors to output tags.

Figure 1:
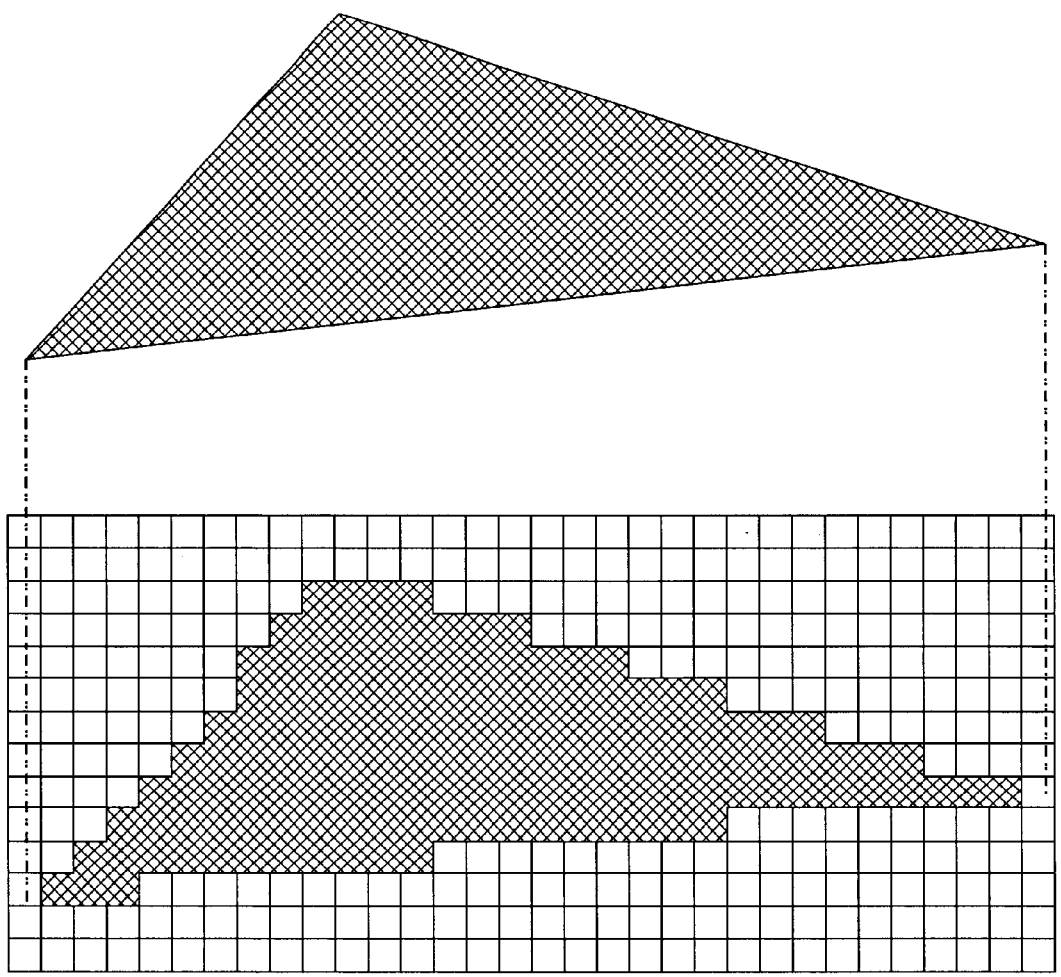
FIG. 1 is an illustration of a potential effect of aliasing in a digitized document image.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. An "image", a pattern of physical light, may include characters, words, and text as well as other features such as graphics. An image may be divided into "segments," each of which is itself an image. A segment of an image may be of any size up to and including the whole image.

Each location in an image may be called a "pixel." Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

An "image input device" is a device that can receive an image and provide an item of data defining a version of the image. A "scanner" is an image input device that receives an image by a scanning operation, such as by scanning a document.

An "image output device" is a device that can receive an item of data defining an image and provide or render the image as output. A "display" is an image output device that provides the output image in human viewable form.

It should be noted that edge-detector methods other than the logic-based processes described herein may be used within the overall identification system for gray border pixels. We describe here a logic-based implementation because it is preferred for cost and speed reasons over arithmetic-based edge detectors.

Figure 2:
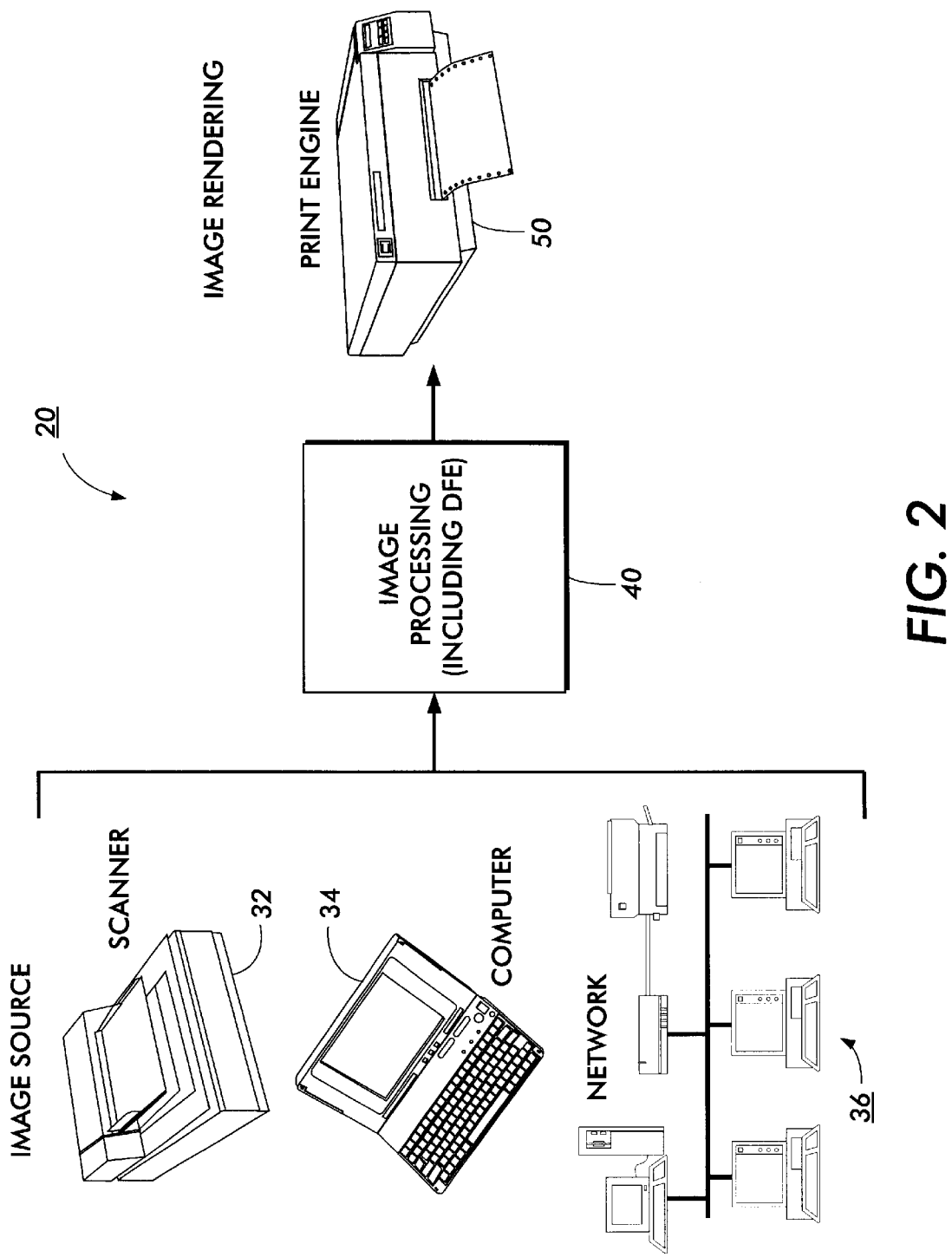
FIG. 2 is a general representation of a suitable system-level embodiment for one or more aspects of the present invention.

Turning now to FIG. 2, depicted therein is an embodiment of a preferred digital imaging system. In the system 20, image source 30 is used to generate image data that is supplied to an image processing system, that may incorporate what is known in the art as a digital front end (DFE) 40, and which produces binary data for rendering by print engine 50. For example image source 30 may include scanner 32, computer 34, network 36 or any similar or equivalent image input terminal. On the output end printer engine 50 is preferably a xerographic engine however engine 50 may include such equivalent alternatives as ink jet, etc. The present invention is directed towards aspects of image processor 40 depicted in FIG. 2. In particular, the intention of the present invention is to identify those pixels generated along antialiased regions of the input image.

Figure 3:
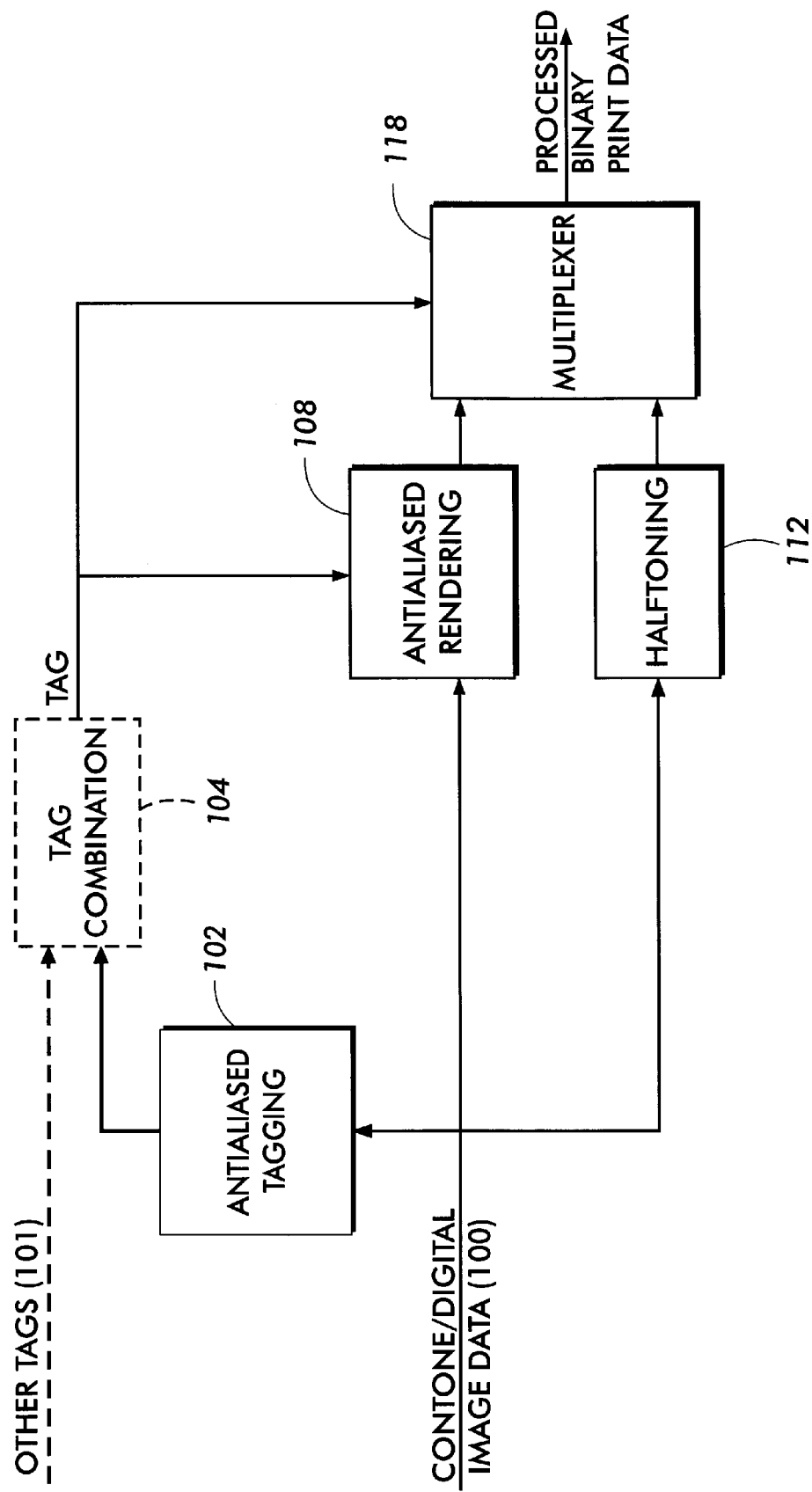
FIG. 3 is a generalized data flow representation of one embodiment of the present invention.

Referring now to FIG. 3, shown therein is a detailed diagram depicting the data flow in one embodiment of the present invention. System 40 includes a method for transforming the continuous tone (contone)/digital data into processed output data. In FIG. 3 the contone/digital image data 100 is provided to one portion of image processing system 40. In particular, the data flow of FIG. 3 depicts that portion of data that would be received from a digital front end (DFE) system having processed the raster image data, where the contone data (100) is then supplied as indicated on the leftmost side of the figure. The contone data 100 is supplied to an antialias tagging block 102, an antialiased rendering block 108, and a halftoning block 112.

The output of antialias tagging block 102 is a tag indicating a determination of whether or not the pixel in question has been antialiased in the DFE. The tag output is supplied to antialias rendering block 108 to control processing therein, and is also used as a select signal in multiplexer 118. More importantly, the tag may be a multiple-bit tag as will be described herein, and various bits therein may be employed by the different sub-processes receiving the tag data. As depicted in the figure, an alternative embodiment could also incorporate an incoming tag (other tag) 101 that provides further information, for example, pixel type (line art, text, pictorial, halftone, antialiased, etc.). The other tag could be combined with the antialiased tag within a tag combination function such as represented by operation 104. In one embodiment, the DFE may output the "other tag" indicating some attribute for a given pixel or group of pixels. That tag may be combined with the tag produced by the antialiased tagging block 102 to yield a rendering tag that possesses more information or more accurate information on a particular pixel and how it should be rendered. The combination operation carried out at 104 may be accomplished by a look-up table and the resulting tag would then be employed to direct the antialiased rendering The output of antialias rendering block 108 and halftoning block 112 are both supplied as inputs to multiplexer 118 and selection of one of the two inputs is used to produce the process binary print data that is output from multiplexer 118. Alternatively, the selection operation could be used to choose which rendering method to perform, rather than select one of a collection of output signals that have been generated.

Figure 4:
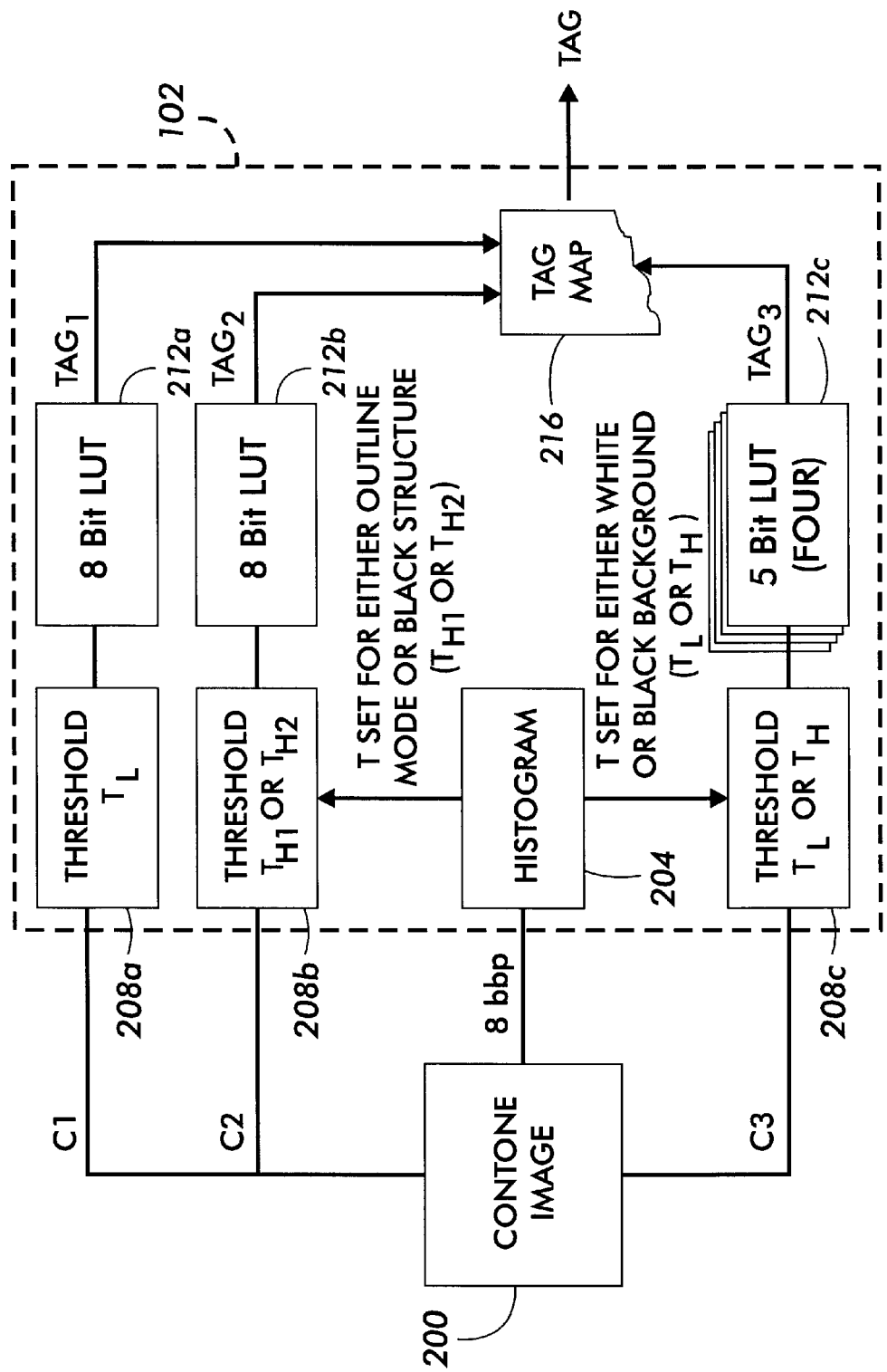
FIG. 4 is a detailed block diagram of a the Antialiased Tagging block depicted in FIG. 3.

Referring to FIG. 4, an embodiment for the antialias tagging operations carried out in block 102 will be described in detail. As previously characterized the present invention enables the recognition and tagging of fine gray features within an antialiased image, features that have both high and low contrast neighbors, and border pixels of gray objects or gray background. More specifically, the embodiment depicted in FIG. 4 enables the detection and tagging of antialiased pixels and border pixels that:

(a) have high contrast neighbors (e.g., gray pixels with black and/or white neighbors);

(b) are fine gray features;

(c) are outlines of gray strokes on white or gray background (i.e., pixels on the edge of gray objects); and (d) are outlines of white strokes on gray background.

Although it will be appreciated that the logic operations employed to accomplish the tagging may be implemented in many equivalent forms (including serial/pipelined, parallel), the embodiment is depicted in FIG. 4 using three channels. For example, it may be possible to simply implement the functionality of each channel separately, in a serial form, where the functionality of a channel is accomplished by a single hardware channel and the operations are carried out in a time-sliced fashion so as to minimize the hardware requirements. Similarly, it may be possible to logically combine the functionality of one or more channels using larger logic components. Additionally, higher level operations, e.g., arithmetic, can be used within the edge and pattern detection circuitry instead of the lower level logic operations shown here. The logic-based implementation is described herein because it is preferred for reasons of cost and speed.

In FIG. 4, the continuous tone image data is first received and may be temporarily stored in a continuous tone image buffer 200. Buffer 200 is preferably a high-speed, FIFO-type memory for storing a plurality of image signal sufficient to establish a context for the tagging circuitry to be described. In one embodiment, buffer 200 would store on the order of 5 scanlines (rasters) of continuous tone image data. The continuous tone image data is made available to a histogram operation 204 in an 8 bits/pixel format. Although depicted as a common operation, the histogrammer 204 may be a separate operation that could be performed independently on each of the three channels ($C_1$–$C_3$).

Aspects of channel C1, as well as some details for channels C2 and C3 are escribed in co-pending U. S. patently application Ser. No. 09/046,414 for a "METHOD TO ENABLE THE RECOGNITION AND RENDERING OF ANTIALIASED IMAGES," previously incorporated by reference. The following description is directed of further modifications to the methods described in U.S. patent application Ser. No. 09/046,414, which include the histogram operation and its affect on channels C2 and C3. Histogramming allows the system to perform outlining in channel C2, and in channel C3 it enables adequate tagging of fine gray features surrounded by non-white pixels. The histogrammer employs an observation window about the target pixel from which it receives its input data. Referring to FIG. 5, a 5×5 window is used for sufficient pixel information context, where the twenty-five pixels in the subset are represented as $x_1, x_2, \ldots, x_{25}$ and where $x_{13}$ is the current or target pixel at the center of the window.

The function of histogrammer 204 is multi-fold. For outlining the border between gray and white objects, the histogram operation determines or estimates if a gray object is present on a white background (or similarly, a white object is present on gray background) or that a structure present within the region is predominantly black. The conditions for such a determination are (a) no black pixels are detected by the histogram, and (b) some number of white pixels are detected by the histogrammer. In particular, for $cnt_1$=number of pixels within window with gray value<low gray level (e.g. 5—nearly white), and $cnt_2$=number of pixels within window with gray value>high gray level (e.g. 250—nearly black).

A pixel is estimated to be a gray object on a white background, or its converse if $cnt_1$>=some chosen number (e.g., 2) and $cnt_2$=0:

Second, for outlining a gray object on a gray background the histogrammer counts gray levels and determines if primarily two gray level populations are present that define foreground and background. In particular, for $cnt_1$=number of pixels within window at or near a particular gray value, and $cnt_2$=number of pixels within window at or near a different particular gray value, $cnt_3$=number of pixels within window with gray value>high gray level (e.g. 250—nearly black).

It is estimated to be a gray object on a gray background, $cnt_1$ and $cnt_2$>=some chosen number (e.g., 5) and $cnt_3$=0:

Third, for tagging fine gray features, the histogrammer estimates if the background of a region (e.g., context region stored in buffer 200) is black (nearly unsaturated) or white (nearly saturated). In a preferred embodiment, this is accomplished by comparing the white pixel count to black pixel count for the region. The predominant count is determined to be the background. In particular, $cnt_1$=number of pixels within window with gray value<low gray level (e.g. 5—nearly white), and $cnt_2$=number of pixels within window with gray value>high gray level$_{TH}$ (e.g. 250—nearly black).

If $cnt_1$>=$cnt_2$, then the current pixel is estimated to be a positive feature on a white background; otherwise when $cnt_1$>$cnt_2$, then the current pixel is estimated to be a negative feature on a black background.

Once the histogrammer operation is carried out, for each target pixel, the histogrammer outputs signals to at least channels C2 and C3 so as to control the selection of threshold levels for further processing of the contone image. More specifically, the thresholds are set within channels C2 and C3 to reflect the background and foreground levels. The background and foreground levels are the preferred image criterion used to select threshold, and thus binarize the contone signal. In channel C2 the threshold $T_{H1}$ will be selected whenever the histogrammer 204 determines that a gray object is present on a white background, otherwise $T_{H2}$ is selected, $T_{H1}$ being a level between the gray level of the image and the white $T_{H2}$ being a level near black (e.g., 250). Also for channel C2, the threshold T will be selected whenever the histogrammer 204 determines that a gray object is present on a gray background, where T is between the background and foreground gray levels. Similarly, for channel C3, $T_L$ (level near the white background level, e.g., 5) is selected for a white background and $T_H$ (level near the black background, e.g., 250) for a black background. It will be appreciated that the specific threshold levels for each of the channels may be downloadable or preprogrammable so as to allow the system to adapt to document images of various types. Once selected, the thresholds are applied to the contone image on each of the three channels (C1–C3) to produce a binary output for a subset of the image region. The vector is then applied to a look-up table 208 where the vector is converted into the respective output signal for each channel. For example, the 8-bit vector of channel $C_1$ is converted into a single bit output tag ($Tag_1$).

Subsequently, two different 256-element look-up tables (FIG. 4; 212a, b) are used to characterize the local structure and identify the fill-order for the target pixel. A look-up table, an example of a portion of the table 212b (channel C2) appears in FIG. 6, is used in the present invention to map binary vectors to outputs in accordance with a logical representation. The table in FIG. 6 shows not only the possible input vectors (center column), but also the output tag, including a split tag. More specifically, the meaning of the output tags depicted in the table are as follow:

00—nominal imaging dot;
01—right fill;
10—left fill;
11—center fill; or
s/11—meaning that the fill should be split about the center.

The general logic operations accomplished by the tables are described in the copending U.S. patent application Ser. No. 09/046,414, previously incorporated herein by reference. It should be noted, however, that the embodiment described herein employs the full 8-bit vector so as to enable a full characterization of all possible vectors as well as make a determination of an appropriate fill order—including a split filling operation. The output bits are employed to define a preferred output rendering state, comprising: right fill; left fill; center fill, split fill; or nothing (use default or normal rendering process). It will be appreciated that further output states may be characterized by using tags having more bits. Further bits may be employed, as depicted in FIG. 6, to provide a tag indicative of the target pixel's presence within an outline.

Having determined a preferred fill or rendering method, the system concurrently determines whether the current pixel is an antialiased pixel or not. This operation is accomplished in combination with channel C3. In the embodiment depicted in FIG. 4, channel C3 utilizes four 32-element look-up tables (212c). The four look-up tables preferably implement logical operations for antialiased tagging similar to those described in U.S. patent application Ser. No. 09/046, 414, previously incorporated by reference. In particular, the four 5-bit inputs to the tables are horizontal vector $x_{11}x_{12}x_{13}x_{14}x_{15}$, vertical vector $x_3x_8x_{13}x_{18}x_{23}$, left to right vector $x_1x_7x_{13}x_{19}x_{25}$, and right to left diagonal vector $x_5x_9x_{13}x_{17}x_{21}$ thereof, which may also be characterized as "cuts" across the image region. One skilled in the art should appreciate that the use of look-up tables as depicted in FIG. 4 provides not only a cost-effective method to implement the required logical operations, but also provides a programmable method by which the characteristics of an image may be optimized—simply by downloading a new table.

Once the tags ($Tag_1$–$Tag_3$) are generated for each channel, they may be supplied to a tag map 216 where combinatorial logic is employed to give precedence to tags from some channels and to ultimately generate an antialiased pixel tag, and optionally a rendering tag indicative of a preferred rendering method. In one embodiment, the combinatorial logic employed for tag map 216 may be represented as follows:

Tag=$Tag_2$ AND ($Tag_1$ OR $Tag_3$).

Having described the operation of an improved antialiased or edge pixel tagging system, the following description characterizes the enhanced tagging functions from the perspective of the function of each channel.

The function of channel C1 is to tag white/other structures within the image. In other words to determine if white pixels are present. This is accomplished using low threshold ($T_L$<5) to distinguish between white and other. It is also contemplated that channel C1 may be employed to examine the structure of white pixels. The output of channel C1 is preferably a single-bit binary output (1 or 0) indicating the presence of a white structure.

Channel C2 has three possible tagging functions, and the use of one or the other is a function of the output from the histogrammer 204. The first function is to determine the structure between black and other, and uses a threshold $T_{H2}$>250. The second function determines the structure between white and gray, using a threshold 0<$T_{H1}$<Gray. The third function determines the structure between gray foreground objects and gray background. The output of channel C2 is a multi-bit output so as to enable the indication of a preferred rendering method such as pixel shifted right, left, center, split, system default, or outline (meaning that a gray object on a white field, its converse, or gray object on gray was found and appropriate outline rendering signals should be employed).

Channel C3 is preferably employed to tag fine gray features. Channel C3 accomplishes this by identifying the structure between gray and background regions. The background level is determined within the histogrammer and a high or low threshold is used in channel C3 depending on the histogrammer finding a black background or white background, respectively. The output of channel C3, as indicated previously, is a single-bit, binary (0 or 1) output indicating whether C3 has determined that the target pixel is antialiased or not.

Thus, the system described herein preferably employs and enables the following. An adaptive threshold used for tagging fine features that are gray due to antialiasing. The adaptation allows tagging the gray feature equally well if it has a light background or a dark background. The threshold is chosen by comparing white pixel counts to black pixel counts in the histogrammers. Tagging is performed in channel C3. The tagging of border pixels of gray objects is also enabled by the system described herein. Primarily, the gray edge pixels of gray objects (inside border) on a white background are identified for tagging. However, it is also possible to employ the system in tagging white pixels that are adjacent to gray pixels (outside border), and the only difference would be in the templates that are loaded into the look-up tables. This tagging is performed by choosing a threshold that distinguishes between foreground and background. If the foreground was black, the threshold is set near black. If the foreground is gray, the threshold is set just below that gray value so that the resulting binary image possesses 1's and 0's for foreground and background. This scheme also works for gray background and white strokes—the process is identical. The difference could occur in a user's choice of templates for tagging the inside border or outside border. Having this "outline tag" allows edges to be treated with special screens for edges (high frequency) while treating the remainder of the gray field using a halftone that is suitable for larger areas. The histogrammer views the window pixels and determines if a particular image region is gray and white or possesses black. If black is not present the threshold is set to distinguish gray from white. As described above, the histogrammer sets a threshold for channel C2.

Lastly, the system described herein allows for the outline tagging of gray objects in a gray field. The histogrammer counts gray values to determine if the window pixels consist of primarily two distinct gray populations. If so, a threshold can be chosen to distinguish between the populations, and pattern matching can then be performed on the thresholded signal. Currently, channel C1 indicates if any white is present. The output of channel C1 is preferably used in conjunction with channel C2 in the identification of high contrast neighbors. In the present case, however, the histogrammer result of "two gray populations" would obviate the need for the signal from channel C1.

In recapitulation, the present invention is a method and apparatus for tagging of antialiased pixels and border pixels of gray objects within a document image. In addition to the added features of outlining borders between gray objects, the techniques described improve the recognition of fine gray features by using thresholds that adapt to a light or dark background. The system relies on the establishment of the sense (positive/negative, gray and white, two populations of gray, etc.) of an image by first using a histogramming operation. Once the sense is determined, a plurality of logical channels are used to select a threshold, binarize a region of the image, generate a vector or vectors representative of the region, and to process the vectors to identify whether an antialiased pixel or border pixel is present therein. Subsequently, the output of the channels is logically combined to produce an antialias (border) tag.

It is, therefore, apparent that there has been provided, in accordance with the present invention, a method and apparatus for tagging of antialiased pixels within a document image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An edge-detecting method for detecting antialiased pixels within continuous one image data representing an image, including the steps of:
   determining a threshold for a region of the image;
   in a first channel,
      setting a threshold to be used to binarize the region of the image, the threshold being determined as a function of a first image criterion,
      thresholding at least a region of the continuous tone image to create a binarized image region,
      extracting, from the binarized image region, a vector comprised of a predefined set of pixels within the binarized image region,
      applying the vector to a first channel logic operation to determine if a predefined pattern is present, and if so, indicating the presence of the pattern as a first channel output;
   in a second channel,
      setting a second threshold to be used to binarize the region of the image, the second threshold being determined as a function of a second image criterion,
      thresholding the region of the continuous tone image to create a second binarized image region,
      extracting, from the second binarized image region, a vector comprised of a predefined set of pixels within the second binarized image region,
      applying the vector to a second channel logic operation to determine if a second predefined pattern is present, and if so, indicating the presence of the second pattern as a second channel output; and
   logically combining the outputs of at least the first channel and the second channel to produce a tag indicative of the presence or absence of a gray border within the region of the image.

2. The method of claim 1, wherein the region of the image is centered about a target pixel, and where the tag particularly indicates whether the target pixel is antialiased.

3. The method of claim 1, wherein the step of determining a background level for the image includes the steps of:
   histogramming the image to identify the frequency of occurrence for each of the range of continuous tone levels;
   counting the number of pixels having a continuous tone level that is less than a lower threshold ($T_L$);
   counting the number of pixels having a continuous tone level that is greater than an upper threshold ($T_H$);
   determining, as a function of the numbers of pixels less than $T_L$ and greater than $T_H$, whether the feature within the region of the image is a positive or negative feature.

4. The method of claim 1, wherein the first and second channel logic operations are completed by applying the respective vectors to independent look-up tables, each look-up table generating an output for the respective channel.

5. The method of claim 4, wherein the look-up tables are preprogrammed with patterns so as to generate, in addition to an antialias tag, a fill-order tag to direct the rendering operation.

6. The method of claim 1, further including the steps of:
   in a third channel,
      setting a third threshold to be used to binarize the region of the image, the third threshold being determined as a function of a third image criterion,
      thresholding the region of the continuous tone image to create a third binarized image region,
      extracting, from the third binarized image region, a vector comprised of a predefined set of pixels within the third binarized image region,
      applying the vector to a third channel logic operation to determine if a third predefined pattern is present, and if so, indicating the presence of the third pattern as a third channel output.

7. The method of claim 2, wherein each channel defines and operates on an image region of a different size.

8. The method of claim 7, wherein the step of determining a background level for the image includes, independently for each channel, the steps of:
   histogramming the image, within the region defined for the channel, to identify the frequency of occurrence for each of the range of continuous tone levels;

counting the number of pixels having a continuous tone level that is less than a lower threshold ($T_L$);

counting the number of pixels having a continuous tone level that is greater than an upper threshold ($T_H$);

determining, as a function of the numbers of pixels less than $T_L$ and greater than $T_H$, whether the feature within the defined region of the image is a positive or negative feature.

9. The method of claim 1, wherein the first image criterion is the image background level.

10. The method of claim 1, wherein the second image criterion is the image foreground level.

11. An apparatus for detecting border pixels, including antialiased pixels, within continuous tone image data representing an image, including:

means for histogramming the continuous tone image data to determine a threshold for a region of the image;

a first channel, having a thresholder to binarize the region of the image using a threshold determined as a function of a first image criterion, and create a binarized image region, vector memory for storing a vector comprised of a predefined set of pixels within the binarized image region, the vector being extracted from the binarized image region, a look-up table for receiving the vector from said vector memory, applying the vector to a first channel logic operation to determine if a predefined pattern is present, and if so, indicating the presence of the pattern in an output of the look-up table; a second channel, having a thresholder to binarize a second region of the image using a threshold determined as a function of a second image criterion, and create a second binarized image region, second vector memory for storing a second vector comprised of a predefined set of pixels within the second binarized image region, the second vector being extracted from the second binarized image region, a second look-up table for receiving the vector from said second vector memory, applying the vector to a second channel logic operation to determine if a predefined pattern is present, and if so, indicating the presence of the pattern in an output of the second look-up table;

a tag map for logically combining the channel outputs to produce a tag indicative of the presence or absence of an antialiased pixel within the region of the image.

12. The method of claim 11, wherein the first image criterion is the image background level.

13. The method of claim 11, wherein the second image criterion is the image foreground level.

14. The apparatus of claim 11, wherein the look-up tables are preprogrammed with patterns so as to generate, in addition to an antialias tag, a fill-order tag to direct the rendering operation.

15. The apparatus of claim 11, further including:

a third channel, having a thresholder to binarize a third region of the image using a threshold determined as a function of a third image criterion, and create a third binarized image region, third vector memory for storing a third vector comprised of a predefined set of pixels within the third binarized image region, the third vector being extracted from the third binarized image region, a third look-up table for receiving the vector from said third vector memory, applying the vector to a third channel logic operation to determine if a predefined pattern is present, and if so, indicating the presence of the pattern in an output of the third look-up table.

16. A method for identifying thin, gray lines containing antialiased pixels within continuous tone image data representing an image, including the steps of:

identifying a subset of image pixels within a window centered about a target pixel;

histogramming the pixels within the subset;

determining a sense of the target pixel;

as a function of the sense of the target pixel, identifying a fill-order appropriate for the target pixel;

determining whether the target pixel is an antialiased pixel; and generating an output tag indicative of the fill-order and antialiased nature of the target pixel.

17. A method for detecting antialiased pixels within continuous tone image data representing an image, including the steps of:

determining a threshold for a region of the image;

in a first channel, setting a threshold to be used to binarize the region of the image, the threshold being determined as a function of an image background level, thresholding at least a region of the continuous tone image to create a binarized image region, extracting, from the binarized image region, a vector comprised of a predefined set of pixels within the binarized image region, applying the vector to a first channel logic operation to determine if a predefined pattern is present, and if so, indicating the presence of the pattern as a first channel output;

in a second channel, setting a second threshold to be used to binarize the region of the image, the second threshold being determined as a function of an image foreground level, thresholding the region of the continuous tone image to create a second binarized image region, extracting, from the second binarized image region, a vector comprised of a predefined set of pixels within the second binarized image region, applying the vector to a second channel logic operation to determine if a second predefined pattern is present, and if so, indicating the presence of the second pattern as a second channel output; and logically combining the outputs of at least the first channel and the second channel to produce a tag indicative of the presence or absence of an antialiased pixel within the region of the image.

* * * * *